US008351443B2

United States Patent
Wang et al.

(10) Patent No.: US 8,351,443 B2
(45) Date of Patent: Jan. 8, 2013

(54) INFORMATION TRANSMISSION AND SERVICE INTEGRATION SYSTEM AND METHOD THEREOF

(75) Inventors: Ching-Yao Wang, Tainan County (TW); Tsung-Jen Huang, Taichung (TW); Ming-Fung Yeh, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 704 days.

(21) Appl. No.: 12/560,426

(22) Filed: Sep. 16, 2009

(65) Prior Publication Data

US 2010/0166004 A1 Jul. 1, 2010

(30) Foreign Application Priority Data

Dec. 31, 2008 (TW) ............................... 97151877 A

(51) Int. Cl.
*H04L 12/56* (2006.01)
(52) U.S. Cl. ....................................... 370/401; 709/250
(58) Field of Classification Search .................. None
See application file for complete search history.

(56) References Cited

U.S. PATENT DOCUMENTS

| 2006/0133391 | A1 | 6/2006 | Kang et al. | |
|---|---|---|---|---|
| 2006/0159110 | A1 | 7/2006 | Choi et al. | |
| 2007/0130208 | A1* | 6/2007 | Bornhoevd et al. | 707/104.1 |
| 2007/0147396 | A1 | 6/2007 | Lee et al. | |
| 2007/0168925 | A1* | 7/2007 | Bornhoevd et al. | 717/104 |
| 2007/0251998 | A1* | 11/2007 | Belenki | 235/380 |
| 2009/0100492 | A1* | 4/2009 | Hicks et al. | 725/127 |
| 2009/0150480 | A1* | 6/2009 | Xia et al. | 709/203 |
| 2009/0150520 | A1* | 6/2009 | Garcia et al. | 709/219 |
| 2009/0150570 | A1* | 6/2009 | Tao et al. | 709/249 |

FOREIGN PATENT DOCUMENTS

CN 1197297 4/2005

OTHER PUBLICATIONS

"First Office Action of China Counterpart Application", issued on Jul. 12, 2011, p. 1-p. 10.

* cited by examiner

*Primary Examiner* — Hassan Phillips
*Assistant Examiner* — Duc Duong
(74) *Attorney, Agent, or Firm* — Jianq Chyun IP Office

(57) ABSTRACT

An information transmission and service integration system for transmitting a message between at least one information transmission device and at least one service providing terminal is provided. The information transmission and service integration system includes an interface registry repository, a device gateway, and a service gateway. The interface registry repository stores device interface meta-data (DIMD) of the information transmission device and service interface meta-data (SIMD) of the service providing terminal. The device gateway detects and adapts the information transmission device according to the DIMD information. The service gateway transforms and transmits the message between the information transmission device and the service providing terminal according to the DIMD information and the SIMD information. Thereby, the information transmission and service integration system can automatically establish an information transmission channel between the information transmission device and the server-providing terminal.

19 Claims, 9 Drawing Sheets

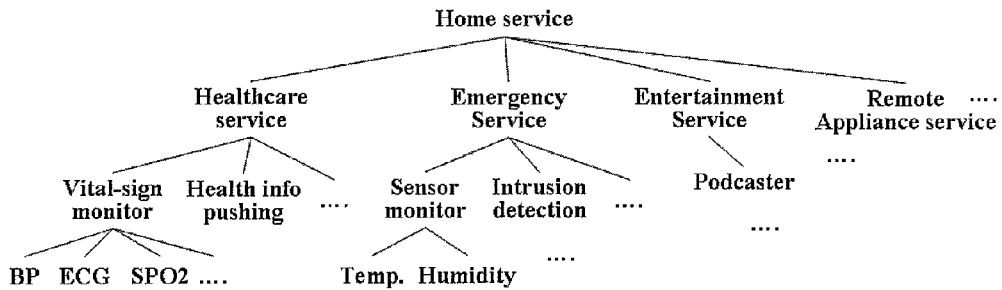

FIG. 2

```
<DIMD>
    <Provider>
        <ID>D1</ID>
        <Name>Philips</Name>
        <Description>......</Description>
        ......
    </Provider>
    <Interfaces>
        <Interface>
            <Service type>Healthcare Service.Vital-sign Monitor.BP</Service type>
            <Message format> IEEE 11073</Message format>
            <Binding info>
                <Connection mode>active</Connection mode>
                <Association string>......</Association string>
                <Bundle address>http://localhost/deviceInterface/philipsECG.class</Bundle address>
                ......
            </Binding info>
        </Interface>
    </Interfaces>
</DIMD>
```

FIG. 3

```
<SIMD>
  <Provider>
    <ID>SP1</ID>
    <Name>HealthMonitor CO.</Name>
    <Description>....</Description>
    .....
  </Provider>
  <Interfaces>
    <Interface>
      <Service type>Healthcare Service.Vital-sign Monitor.BP</Service type>
      <Message format>IEEE 11073</Message Format>
      <Binding info>
        <WSDL address>http://www.healthmonitor.com/service/ecg.asmx?wsdl</WSDL address>
        <SMTP address>.....</SMTP address>
      </Binding info>
      .....
    </Interface>
  </Interfaces>
</SIMD>
```

FIG. 4

INFORMATION TRANSMISSION AND SERVICE INTEGRATION SYSTEM AND METHOD THEREOF

CROSS-REFERENCE TO RELATED APPLICATION

This application claims the priority benefit of Taiwan application serial no. 97151877, filed Dec. 31, 2008. The entirety of the above-mentioned patent application is hereby incorporated by reference herein and made a part of specification.

BACKGROUND

1. Field

The disclosure generally relates to an information transmission and service integration system and an information transmission and service integration method.

2. Description of Related Art

Along with the rapid development of the Internet, various convenient digital home applications and services (for example, tele-home care, remote monitoring, smart appliances, home surveillance, and video on demand, etc) have been developed. The digital home service proposed by the ECHONET consortium combines various front-end home devices, smart appliances, sensors, and back-end service providers, wherein a home gateway plays a very important role for establishing a communication channel between the internal home network and the external service network.

Through a home gateway, different home devices can communicate with each other and difference service providers' services. A service provider can provide more diverse services based on its computation and storage ability. To integrate home devices and remote services, a home gateway has to provide high flexibility in software and hardware extension, sufficient computation and storage capability, low maintenance cost, and simple operation process to allow device suppliers and service providers to make the concept of digital home service network a reality.

Thereby, a home gateway is attempting to be developed as an information integration platform such that a solution provider can develop a device interface to integrate a front-end home device and a service interface to integrate a back-end service system in the home gateway so as to establish an information transmission channel according to the application requirement. Accordingly, various convenient digital home applications and services can be developed.

However, according to the existing techniques, the device interfaces and service interfaces developed by different solution providers cannot work together in the same home gateway. Thus, regarding each new-coming device, the solution provider has to develop another device interface in the home gateway to integrate the device; and regarding each new-coming service provider, the solution provider has to develop another service interface in the home gateway to integrate the service system. With the lack of an autonomic device-service composition and integration ability, the solution provider has to re-establish the information communication channel between the device and the service provider every time when a new device or a new service provider joins the network.

In the past, some for-profit and non-profit companies and organizations set up an Open Service Gateway Initiative (OSGi) consortium, which includes various suppliers of system equipments, consumer electronics, and vehicles, such as IBM, Motorola, Nokia, Philips, Panasonic, Sony, Toshiba, Echelon, and BMW etc. The OSGi consortium expects to establish an open service platform in home gateway to allow devices and services provided by different providers to communicate with each other. In addition, for improving the maintenance capability of a distributed home service network, the OSGi consortium also establishes a remote management and deployment mechanism on this home service platform, such that a solution provider can deploy interfaces, application programs, and add-on services to a user-end home gateway through the Internet.

Besides the OSGi consortium, other international organizations, such as ECHONET, DLNA, and CELF, also propose their home service platforms to be applied to different information transmission and service integration.

Although a solution provider can provide digital home service solutions more conveniently and easily by an open service platform, the solution provider has to install necessary device interfaces and service interfaces in the home gateway and then implement their integration logics in advance according to the application requirements. Thus, the solution provider still has to maintain and manage the home gateway when a device interface or a service interface is changed, for example, a new device or a new service provider is added. Thereby, an autonomic management mechanism is needed to be developed.

SUMMARY

Accordingly, the present invention relates to an information transmission and service integration system which can automatically detect and adapt different information transmission devices and dynamically bind services provided by remote service systems.

The disclosure relates to an information transmission and service integration method which can automatically detect and adapt different information transmission devices and dynamically bind services provided by remote service systems to establish information transmission channels.

The disclosure provides an information transmission and service integration system for transmitting messages between at least one information transmission device and at least one service providing terminal. The information transmission and service integration system includes an interface registry repository, at least one device gateway, and at least one service gateway. The interface registry repository is used for storing and managing device interface meta-data (DIMD) of the information transmission devices and service interface meta-data (SIMD) of the service providing terminals. The device gateway is used for detecting and adapting the information transmission device according to the DIMD information. The service gateway is used for routing the messages transmitted from a device gateway to a corresponding service provider according to the SIMD information. In the information transmission and service integration system, the device gateway transmits a message received from the information transmission device to the service gateway, and the service gateway transforms and transmits the message according to the SIMD information to the corresponding service providing terminal.

The disclosure provides an information transmission and service integration method for transmitting messages between at least one information transmission device and at least one service providing terminal. The information transmission and service integration method includes storing and managing DIMD information of the information transmission device and SIMD information of the service providing terminal in an interface registry repository. The information transmission and service integration method also includes detecting and adapting the information transmission device according to the DIMD information, transforming and transmitting a message received from the information transmission device to the corresponding service providing terminal according to the SIMD information, and transforming and transmitting a message received from the service providing terminal to the corresponding information transmission device according to the DIMD information.

As described above, the information transmission and service integration system and the method can autonomously composite and integrate the information transmission interfaces for the information transmission devices and the service providing terminals.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 2 illustrates an ontology of a digital home service according to an exemplary embodiment.

FIG. 3 and FIG. 4 illustrate a device interface meta-data (DIMD) of a blood pressure monitor and a service interface meta-data (SIMD) of a health service provider according to an exemplary embodiment

DESCRIPTION OF THE EXEMPLARY EMBODIMENTS

Figure 1:
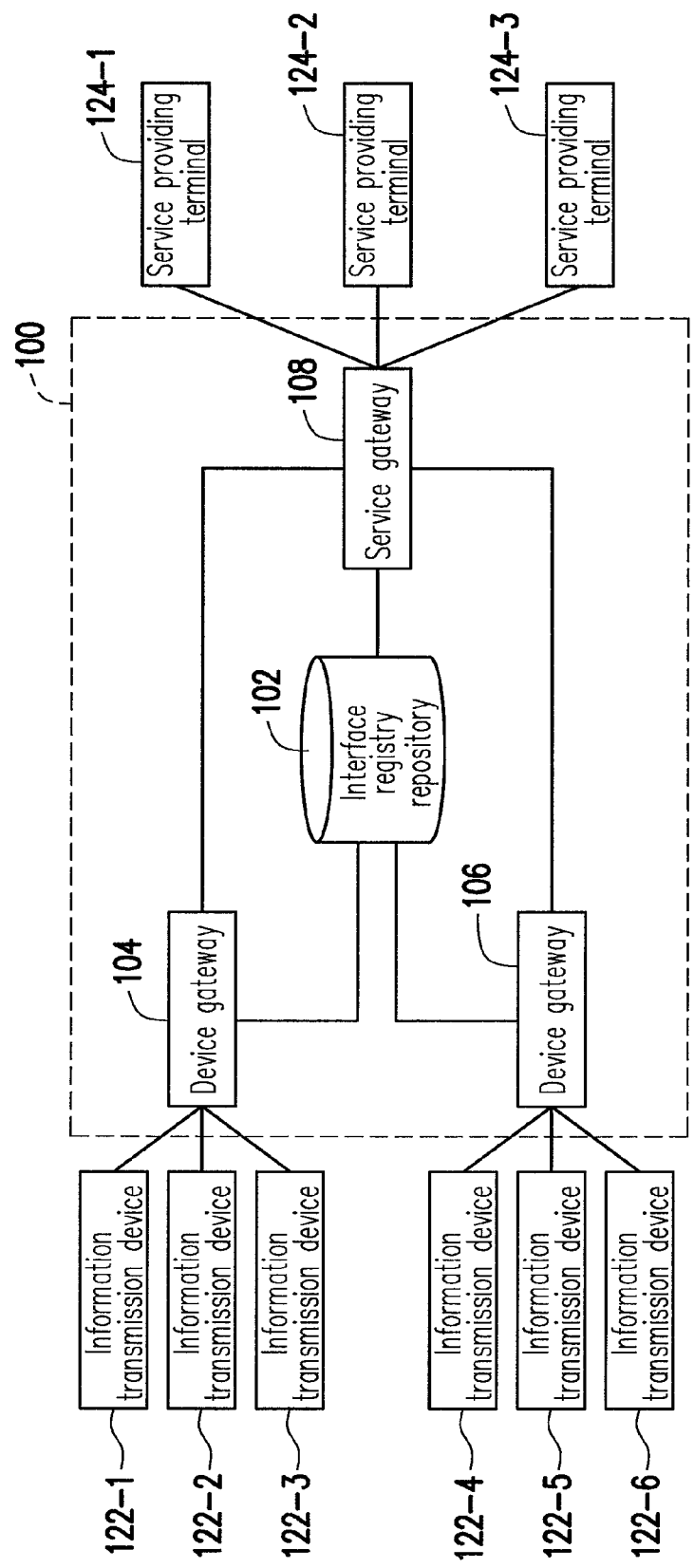
FIG. 1 is a block diagram of an information transmission and service integration system according to an exemplary embodiment.

Reference will now be made in detail to the present preferred exemplary embodiments of the invention, examples of which are illustrated in the accompanying drawings. Wherever possible, the same reference numbers are used in the drawings and the description to refer to the same or like parts.

In the present invention, a service composition concept is applied into an open service platform (for example, the OSGi solution), wherein both a information transmission device (for example, a blood pressure monitor, an emergency button, or a temperature sensor) and a service provider (for example, a health service provider, a emergency service provider, or a monitoring service provider) are considered as service components, and a loose coupling device-service composition architecture between the information transmission devices and the service providers is developed. A solution provider does not need to install and integrate a device interface and a service interface in advance in a home gateway. Instead, the proposed information transmission and service integration system is capable of dynamically loading a corresponding device interface and a corresponding service interface from the interface registry repository, whenever a home device is plugged in, and autonomously performs information adaptation and service integration between the home device and the service provider. As a result, the home device or service provider can be changed flexibly. Below, exemplary embodiments of the present invention will be described in detail with reference to accompanying drawings.

FIG. 1 is a block diagram of an information transmission and service integration system according to an exemplary embodiment of the present invention.

Referring to FIG. 1, the information transmission and service integration system 100 is used for transmitting messages between the information transmission devices 122-1, 122-2, 122-3, 122-4, 122-5, and 122-6 and the service providing terminals 124-1, 124-2, and 124-3. In the present exemplary embodiment, the information transmission and service integration system 100 includes an interface registry repository 102, a device gateway 104, a device gateway 106, and a service gateway 108.

The interface registry repository 102, storing and managing device interface metadata (DIMD) and service interface metadata (SIMD), is designed based on the Universal Description, Discovery, and Integration (UDDI) concept, and accordingly, the functions thereof include interface register and interface discovery. After a device supplier, a service provider and a solution provider reach a cooperation agreement on a service plan, the device supplier and the service provider may register DIMD information and SIMD information related to the service plan in the interface registry repository 102 through the interface register function. On the other hand, the interface discovery function is used for obtaining the DIMD information and SIMD information stored in the interface registry repository 102.

DIMD information is used to represent a home device (for example, the information transmission device 122-1) connected to the device gateway 104 and the device gateway 106, and SIMD information is used to represent a service provider (for example, the service providing terminal 124-1) connected to the service gateway 108

In the present exemplary embodiment, the DIMD information contains the provider information, the service type, the message format, and the binding manner, etc. Taking the DIMD information of the information transmission device 122-1 as an example, the provider information describes identification information of the information transmission device 122-1, the service type describes a service category of the information transmission device 122-1, the message format describes an information transmission format of the information transmission device 122-1, the binding manner describes a connection manner, including a connection mode, an association string, a device interface binding address, and other related adaptation information, of the information transmission device 122-1.

It should be mentioned that the service type is described according to a categorization structure. In the present exemplary embodiment, the service type of an information transmission device is described using a predefined ontology of the digital home services. Based on the ontology of a digital home service illustrated in FIG. 2, the service type of a blood pressure monitor is defined as "Healthcare Service.Vital-sign Monitor.BP".

Similarly, the SIMD information also contains the provider information, the service type, the message format, and the binding manner, etc. Taking the SIMD information of the service providing terminal 124-1 as an example, the provider information describes identification information of the service providing terminal 124-1, the service type describes a service category of the service providing terminal 124-1, the message format describes a information transmission format compatible to the service providing terminal 124-1, and the binding manner describes a network connection manner, for example, a WSDL address, a SMTP address or other standard network transmission manners, of the service providing terminal 124-1. Also, in the present exemplary embodiment, the service type of a service providing terminal is described using a predefined ontology of the digital home services. For example, the service type of a service provider which provides a blood pressure monitoring service is defined as "Healthcare Service.Vital-sign Monitor.BP".

The DIMD and SIMD information are described using a standard descriptive language. In the present exemplary embodiment, the DIMD and SIMD information are described using the eXtensible Markup Language (XML). An example of the DIMD information of a blood pressure monitor and an example of the SIMD information of a blood pressure monitoring service provider are respectively illustrated in FIG. 3 and FIG. 4.

It should be understood that in the present invention, the description of the DIMD and SIMD information are not limited to using XML. In another exemplary embodiment of the present invention, the DIMD and SIMD information may also be described using Comma Separated Value (CSV) or other suitable descriptive languages.

According to an exemplary embodiment of the present invention, the interface registry repository 102 is connected to the device gateways 104 and 106 and the service gateway 108 through a wire network. However, the present invention is not limited thereto, and the interface registry repository 102 may also be connected to the device gateways 104 and 106 and the service gateway 108 through a wireless network.

Additionally, in the present exemplary embodiment, the interface registry repository 102 is designed as a single repository for storing both the DIMD and SIMD information. However, in another exemplary embodiment of the present invention, the interface registry repository 102 may also be designed as a device interface repository and a service interface repository for respectively storing the DIMD information and the SIMD information, so as to speed up the interface discovery performance.

Referring to FIG. 1 again, the device gateway 104 and the device gateway 106 are embedded systems based on an open home service platform, such as OSGi platform. The device gateway 104 and the device gateway 106 automatically detect and adapt different home devices (for example, the information transmission devices 122-1, 122-2, 122-3, 122-4, 122-5, and 122-6) to establish information transmission channels between the home devices and the service gateway 108. In the present exemplary embodiment, the device gateway 104 and the device gateway 106 detect the information transmission devices 122-1, 122-2, 122-3, 122-4, 122-5, and 122-6 based on the Universal Plug and Play (UPnP) standard. However, the present invention is not limited thereto, and other suitable automatic detection techniques (for example, the Java Intelligent Network Infrastructure—JINI) may also be applied to the present invention.

For example, when the device gateway 104 detects the information transmission device 122-1 plugged in by a user, the device gateway 104 searches the DIMD information registered in the interface registry repository 102 to obtains the device interface of the information transmission device 122-1. To be specific, in the case that the information transmission device 122-1 is registered in the interface registry repository 102 in advance, the device gateway 104 can discover the device interface of the information transmission device 122-1 from the interface registry repository 102 and establishes an information transmission channel between the information transmission device 122-1 and the service gateway 108.

Figure 5:
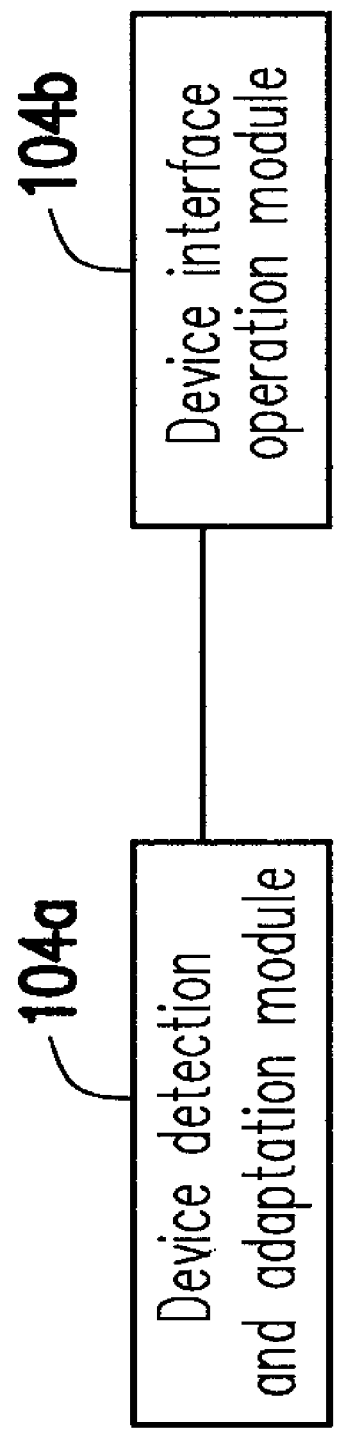
FIG. 5 is a block diagram of a device gateway according to an exemplary embodiment.

FIG. 5 is a block diagram of the device gateway according to an exemplary embodiment of the present invention. The device gateway 104 and the device gateway 106 have similar structures and functions, and the device gateway 104 will be described in detail as an example below.

Referring to FIG. 5, the device gateway 104 consists of a device detection and adaptation module 104a and a device interface operation module 104b.

Figure 6A:
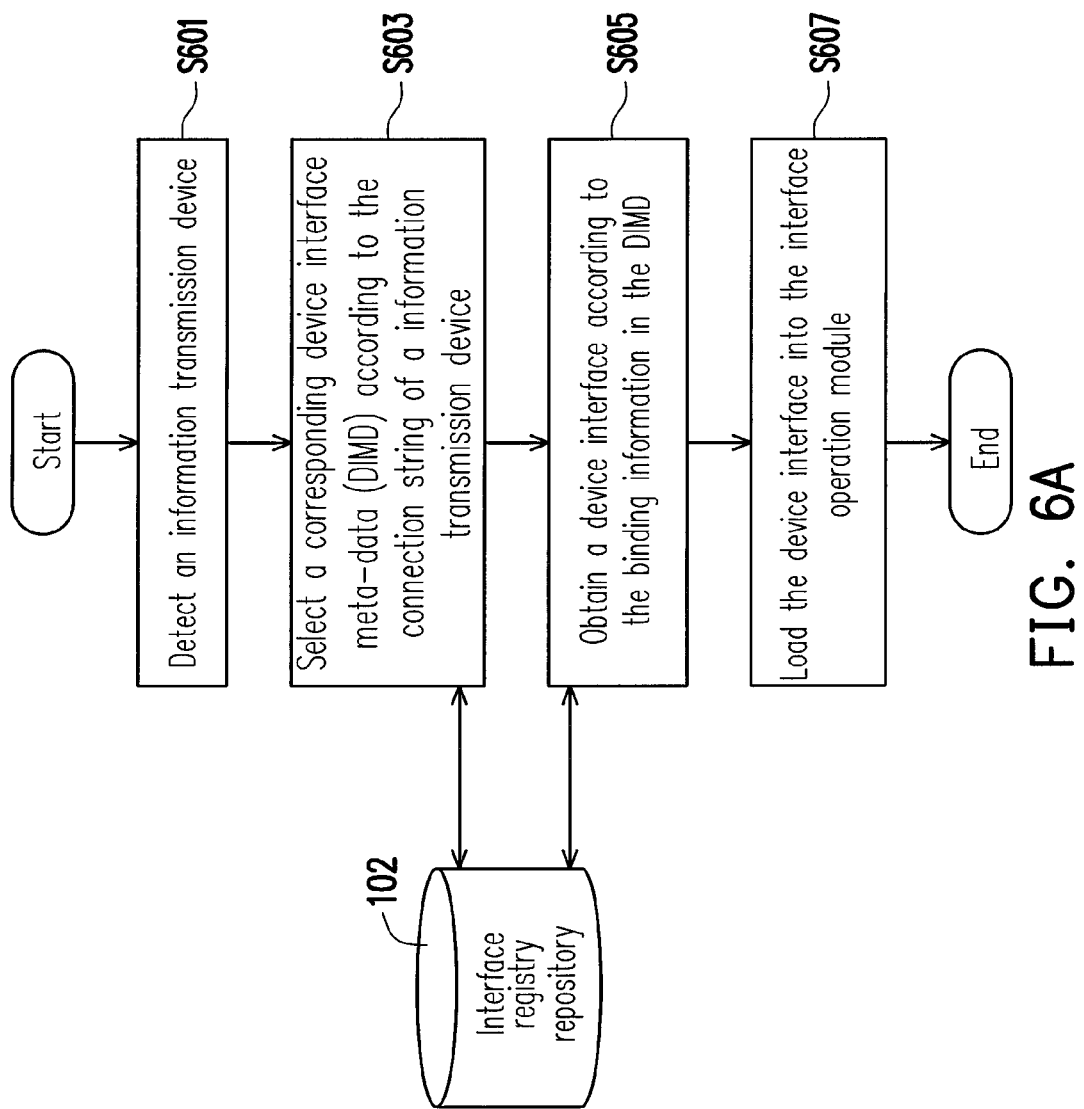
FIG. 6A is an operation flowchart of a device detection and adaptation module according to an exemplary embodiment.

The device detection and adaptation module 104a detects a plug-in home device (for example, the information transmission device 122-1) in a home environment and loads the device interface of the home device from the interface registry repository 102. FIG. 6A is an operation flowchart of a device detection and adaptation module according to an exemplary embodiment of the present invention.

Referring to FIG. 6A, first, in step S601, a plug-in information transmission device in a home environment is detected. Then, in step S603, the DIMD information in the interface registry repository 102 are compared against the connection string of the detected information transmission device, and the corresponding DIMD information is selected. Next, in step S605, according to the binding information in the DIMD information a device interface is obtained from the interface registry repository 102. Finally, in step S607, the device interface is applied to the device interface operation module 104b according to the service type of the DIMD information to carry out subsequent process.

The device interface operation module 104b is responsible to perform a device interface to process a message received from the information transmission device and establishes an information transmission channel between the information transmission device and the service gateway according to the service type information of the information transmission device.

Figure 6B:
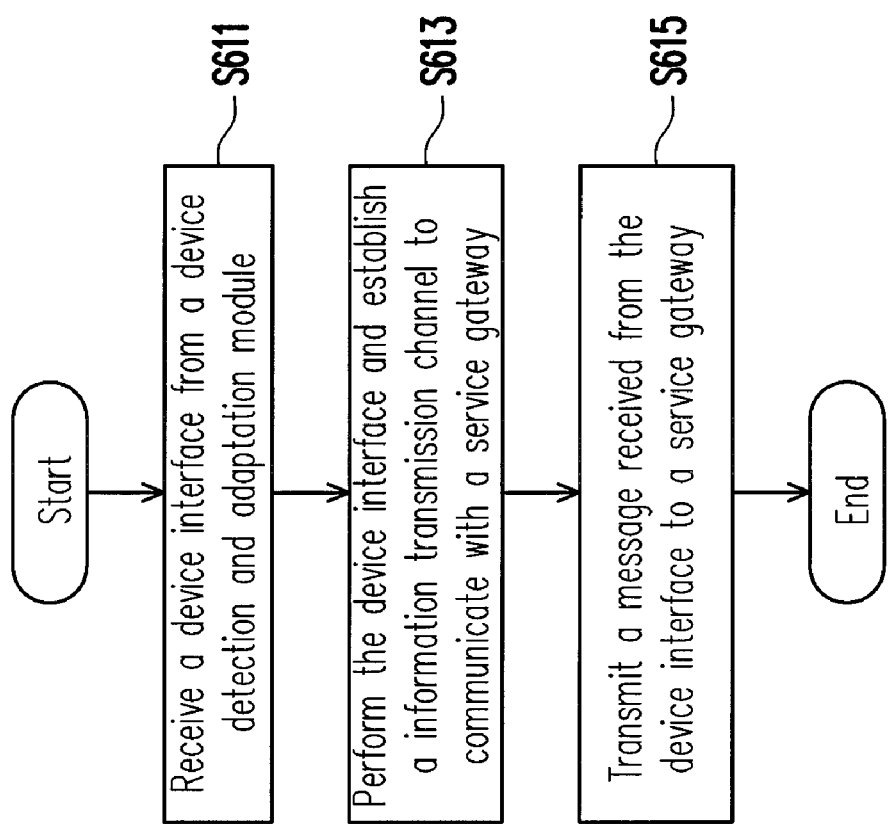
FIG. 6B is an operation flowchart of a device interface operation module according to an exemplary embodiment.

The device interface operation module 104b can be categorized into different service types, such as physiological information monitoring, home environment monitoring, and health education advocating, etc. For example, the processing logic of the physiological information monitoring is "transmitting a signal obtained by the device interface to the service provider", while the processing logic of the health education advocating is "playing a health education information provided by the service provider through the device interface". If the service type of the detected home device is "Healthcare Service.Vital-sign Monitor.BP", the device interface operation module 104b with the processing logic of the physiological information monitoring will be triggered to operate. FIG. 6B is an operation flowchart of a device interface operation module according to an exemplary embodiment of the present invention.

Referring to FIG. 6B, first, in step S611, a device interface is obtained from the device detection and adaptation module. Then, in step S613, the device interface is performed to establish an information transmission channel for communicating with a service gateway. Next, in step S615, a message received from the device interface is transmitted to the service gateway 108 through the established information transmission channel.

It should be mentioned that a device interface operation module can be installed into the device gateway in advance or downloaded from a remote management system. The processing logic of a device interface operation module may be a simple information exchange process (for example, transmitting the information from a device to the service provider or downloading information from the service provider to the device) or a complicated workflow between a device and a service provider. The more complicated the processing logic is, the more complicated interface designs the device and the service provider have.

Referring to FIG. 1 again, the service gateway 108 is responsible to establish secure message communication channels between the devices (i.e., the information transmission devices 122-1, 122-2, 122-3, 122-4, 122-5, and 122-6) and the service providers (i.e., the service providing terminals 124-1, 124-2, and 124-3) such that messages transmitted from the device gateways 104 or 106 can be routed to the corresponding service providers. To be specific, the service gateway 108 will dynamically bind a corresponding service interface of a service provider according to the device gateway identification information (for example, a MAC address) and the service type information of the information transmission device provided by the device gateway, and thereby routing messages transmitted from the devices to the service provider or vice-versa.

Figure 7:
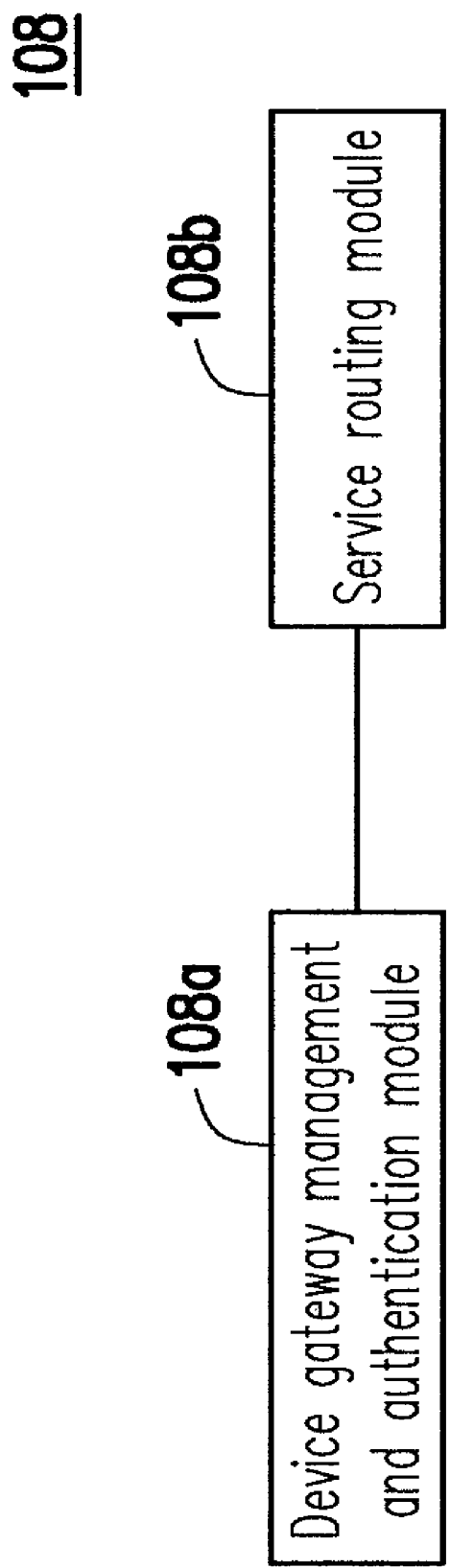
FIG. 7 is a block diagram of a service gateway according to an exemplary embodiment.
Figure 8:
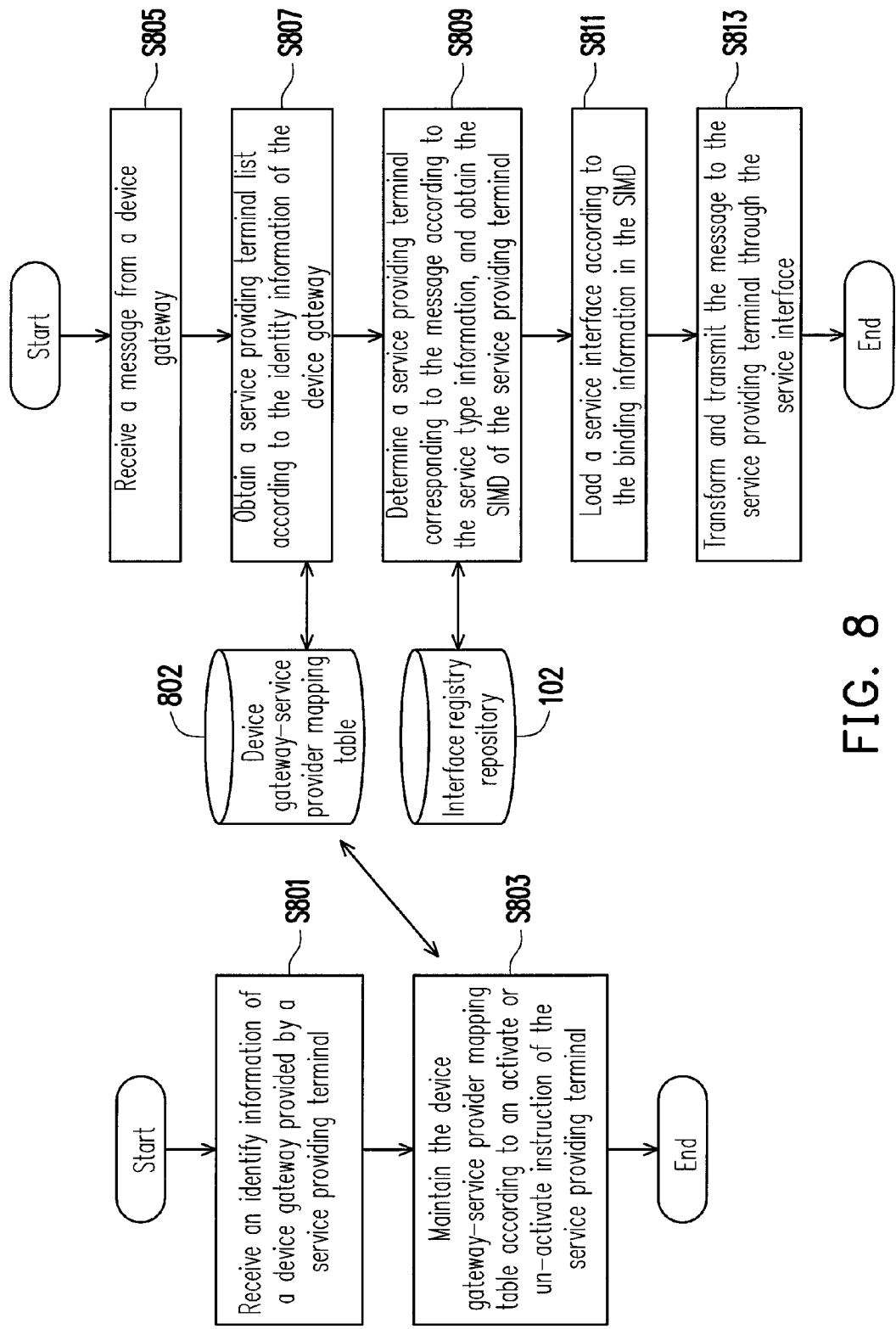
FIG. 8 is an operation flowchart of a service gateway according to an exemplary embodiment.

FIG. 7 is a block diagram of a service gateway according to an exemplary embodiment of the present invention, and FIG. 8 is an operation flowchart of a service gateway according to an exemplary embodiment of the present invention.

Referring to FIG. 7 and FIG. 8, the service gateway 108 includes a device gateway management and authentication module 108a and a service routing module 108b.

The device gateway management and authentication module 108a is responsible to maintain the authentication information between service providers and device gateways. In the present exemplary embodiment, the device gateway management and authentication module 108a utilizes a device gateway-service provider mapping table 802 to maintain the authentication information. Operationally, The device gateway management and authentication module 108a receives the identification information (for example, a MAC address) of a device gateway provided by the service providing terminal (step S801), and then modifies the status in the device gateway-service provider mapping table 802 according to an activation or termination request from the service providing terminal (step S803). Thus, when the service gateway 108 receives a message from the device gateway 104 or 106, the service gateway 108 will accesses the device gateway-service provider mapping table 802 to obtain the service provider which can provide services, according to the identity information of the device gateway 104 or 106.

The service routing module 108b is the core component of the service gateway 108. The service routing module 108b is responsible to receive a message from the device gateways 104 or 106 and routes the message to the corresponding service providing terminal 124-1, 124-2, or 124-3, or inversely, receive a message from the service providing terminal 124-1, 124-2, or 124-3 and routes the response message to the corresponding device gateway 104 or 106.

Referring to FIG. 8, the service routing module 108b receives a message from a device gateway (for example, the device gateway 104) (step S805), wherein the message contains the identification information, service type, user information, message format, and message content of the device gateway, etc. Then, the service routing module 108b obtains a list of service providing terminals from the device gateway-service provider mapping table according to the identification information (step S807). and determines the service providing terminal capable of processing the message according to the service type information and obtains the SIMD information of the service providing terminal from the interface registry repository 102 (step S809). Finally, the service routing module 108b loads and performs a service interface according to the binding information in the SIMD information (step S811), and transforms the received message appropriately and transmits the transformed message to the service providing terminal through the service interface (step S813). In particular, because the message formats processed by the information transmission device and the service providing terminal may be different, the service routing module 108b has to transform the format of the message appropriately according to the message format information received by the device gateway and the message format information (recorded in the SIMD information) received by the service providing terminal.

It has to be understood that in the process illustrated in FIG. 8 is described with the process that the service gateway 108 receives a message from the device gateway and routes the same to the service providing terminal. However, the process of receiving the messages from the service providing terminal and routing the same to the device gateway should be easily understood by those having ordinary knowledge in the art.

In an exemplary embodiment of the present invention, the device gateways 104 and 106 are connected to the service gateway 108 through a wire network. However, in another exemplary embodiment of the present invention, the device gateways 104 and 106 may also be connected to the service gateway 108 through a wireless network.

It should be mentioned that in the present exemplary embodiment, only one service gateway 108 is configured in the information transmission and service integration system 100. However, in another exemplary embodiment of the present invention, multiple service gateways may be configured based on different areas or applications for processing messages transmitted by the device gateways, so as to increase the speed and efficiency of message processing. In addition, besides dynamically binding different service interfaces, the service gateway 108 may also bind the desired service interfaces in a fixed manner in a simple service environment.

Figure 9:
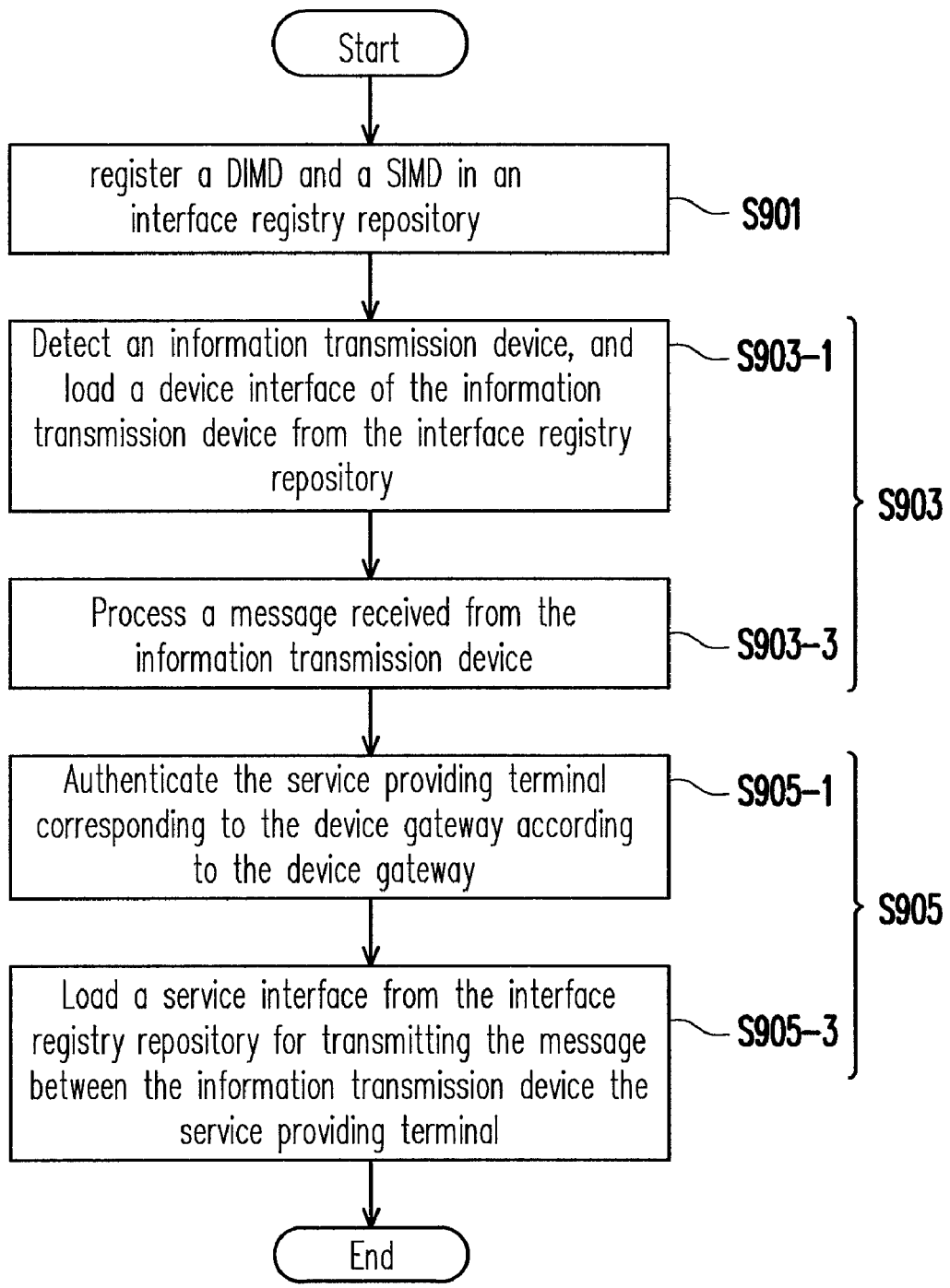
FIG. 9 is a flowchart of an information transmission and service integration method according to an exemplary embodiment.

FIG. 9 is a flowchart of an information transmission and service integration method according to an exemplary embodiment of the present invention.

Referring to FIG. 9, the information transmission and service integration process 900 includes registering DIMD information or SIMD information in the interface registry repository 102 (step S901) in advance. The method of creating DIMD information and SIMD information with a descriptive language has been illustrated in detail above.

Thereafter, in step S903, an information transmission device (for example, the information transmission device 122-1) is adapted according to the DIMD information. To be specific, in step S903, the information transmission device is detected, and a device interface of the information transmission device is loaded from the interface registry repository 102 (step S903-1), and a message received from the detected information transmission device is processed according to the device interface (step S903-3).

After that, in step S905, the message received from the information transmission device is transformed and transmitted to a service providing terminal (for example, the service providing terminal 124-1) or a message received from the service providing terminal is transformed and transmitted to the information transmission device according to the DIMD information and SIMD information. In step S905, the service providing terminal corresponding to the device gateway is determined according to the device gateway-service provider mapping table (step S905-1), and when the authentication succeeds, the messages is transmitted between the information transmission device and the service providing terminal according to the service interface (step S905-3).

As described above, in the present invention, device gateways, service gateways, and an interface registry repository are adopted for automatically detecting and adapting different home information transmission devices and dynamically binding services provided by a remote service system. Thereby, a new device or a new service can be installed and executed without carrying out any complicated updating program. Moreover, through the independent service gateway, a solution provider needs not to plug in the service interface of a service provider in the device gateway; instead, the desired service providers can be dynamically integrated according to the actual requirement of the user. Accordingly, the flexibility in maintenance and management is increased, and the service provider can focus on the service it provides since it only communicates with a service gateway but does not worried about the authentication and management of different front-end device gateways.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An information transmission and service integration system, for transmitting a message between at least one information transmission device and at least one service providing terminal, the information transmission and service integration system comprising:
    an interface registry repository, for storing and managing device interface meta-data (DIMD) of the at least one information transmission device and service interface meta-data (SIMD) of the at least one service providing terminal;
    at least one device gateway, coupled to the interface registry repository for detecting and adapting the at least one information transmission device according to the DIMD information; and
    at least one service gateway, coupled to the interface registry repository and the device gateway for connecting the at least one service providing terminal,
    wherein the at least one device gateway transmits a first message received from the information transmission device and the DIMD information related to the first message to the at least one service gateway, and
    the at least one service gateway transforms and transmits the first message to the corresponding service providing terminal according to the SIMD information,
    wherein the at least one service gateway transforms a second message received from the service providing terminal according to the SIMD information and transmits the transformed second message to the corresponding device gateway, and the corresponding device gateway transmits the second message to the corresponding information transmission device according to the DIMD information.

2. The information transmission and service integration system according to claim 1, wherein the DIMD information and the SIMD information are creating using a descriptive language.

3. The information transmission and service integration system according to claim 1, wherein the DIMD information or the SIMD information comprise:
    an interface provider information, describing an identification information of the information transmission device or the service providing terminal;
    a service type information, describing a service category of the information transmission device or the service providing terminal according to a categorization structure;
    a message format information, describing an information transmission format compatible to the information transmission device or the service providing terminal; and
    a binding manner information, describing a connection manner of the information transmission device or the service providing terminal.

4. The information transmission and service integration system according to claim 3, wherein the categorization structure is an ontology.

5. The information transmission and service integration system according to claim 1, wherein the interface registry repository comprises:
    a device interface repository, for storing the DIMD information; and
    a service interface repository, for storing the SIMD information.

6. The information transmission and service integration system according to claim 1, wherein each the at least one device gateway comprises:
    a device detection and adaptation module, for detecting the information transmission device and loading a device interface corresponding to the information transmission device from the interface registry repository; and
    a device interface operation module, for processing the first message received from the information transmission device according to the device interface corresponding to the information transmission device.

7. The information transmission and service integration system according to claim 1, wherein each the at least one service gateway comprises:
    a device gateway management and authentication module, for maintaining a device gateway-service provider mapping table; and
    a service routing module, for obtaining the corresponding service providing terminal according to the device gateway-service provider mapping table, loading a service interface of the corresponding service providing terminal from the interface registry repository, and transforming and transmitting the first message received from the device gateway.

8. The information transmission and service integration system according to claim 1, wherein the interface registry repository is connected to the at least one device gateway and the at least one service gateway via a wire network or a wireless network.

9. The information transmission and service integration system according to claim 1, wherein the at least one device gateway is connected to the at least one service gateway via a wire network or a wireless network.

10. An information transmission and service integration method, for transmitting a message between at least one information transmission device and at least one service providing terminal, the information transmission and service integration method comprising:
    storing and managing DIMD information of the at least one information transmission device and SIMD information of the at least one service providing terminal in an interface registry repository;
    detecting and adapting the at least one information transmission device according to the DIMD information; and transforming and transmitting a message received from the at least one information transmission device to the corresponding service providing terminal or a message received from the at least one service providing terminal to the corresponding information transmission device according to the DIMD information and the SIMD information, wherein the step of detecting and adapting the at least one information transmission device according to the DIMD information comprises: detecting the at least one information transmission device, and loading a device interface corresponding to the at least one information transmission device from the interface registry repository; and processing a message received from the at least one information transmission device according to the device interface corresponding to the at least one information transmission device.

11. The information transmission and service integration method according to claim 10 further comprising constructing the DIMD information and the SIMD information with a descriptive language.

12. The information transmission and service integration method according to claim 11, wherein the step of constructing the DIMD information and the SIMD information with the descriptive language comprises:

recording an identification information of the information transmission device or the service providing terminal;

recording a service category of the information transmission device or the service providing terminal according to a categorization structure;

recording a information transmission format compatible to the information transmission device or the service providing terminal; and recording a connection manner of the information transmission device or the service providing terminal.

13. The information transmission and service integration method according to claim 12, wherein the categorization structure is an ontology.

14. The information transmission and service integration method according to claim 10, wherein the step of transforming and transmitting the message received from the at least one information transmission device to the corresponding service providing terminal and the message received from the at least one service providing terminal to the corresponding information transmission device according to the DIMD information and the SIMD information comprises:

maintaining a device gateway-service provider mapping table; and transforming the messages received from the at least one information transmission device and the at least one service providing terminal according to the device gateway-service provider mapping table, the DIMD information, and the SIMD information.

15. An information transmission and service integration method, comprising:

constructing DIMD information and SIMD information with a descriptive language and a categorization structure;

maintaining a device gateway-service provider mapping table;

obtaining a corresponding service providing terminal according to the device gateway-service provider mapping table, and loading a service interface of the corresponding service providing terminal according to the DIMD information and the SIMD information; and transforming and transmitting a message between a device gateway and a service gateway according to the DIMD information and the SIMD information.

16. The information transmission and service integration method according to claim 15 further comprising storing the DIMD information and the SIMD information in an interface registry repository.

17. The information transmission and service integration method according to claim 15, wherein the step of constructing the DIMD information and the SIMD information with the descriptive language and the categorization structure comprises:

recording an identification information of an information transmission device to be connected to the device gateway or a service providing terminal to be connected to the service gateway;

recording a service category of the information transmission device or the service providing terminal according to the categorization structure;

recording an information transmission format compatible to the information transmission device or the service providing terminal; and recording a connection manner of the information transmission device or the service providing terminal.

18. The information transmission and service integration method according to claim 15, wherein the categorization structure is an ontology.

19. The information transmission and service integration method according to claim 15, wherein the descriptive language is eXtensible Markup Language (XML) or Comma Separated Value (CSV).

* * * * *